United States Patent [19]

Ohtsuka

[11] Patent Number: 5,077,734
[45] Date of Patent: Dec. 31, 1991

[54] ELECTRONIC EXCHANGE APPARATUS SYNCHRONIZED WITH DIGITAL NETWORK

[75] Inventor: Eiji Ohtsuka, Hino, Japan

[73] Assignee: Kabushiki Kaisha Toshiba, Kawasaki, Japan

[21] Appl. No.: 372,460

[22] Filed: Jun. 28, 1989

[30] Foreign Application Priority Data

Jun. 30, 1988 [JP] Japan .................................. 63-160765

[51] Int. Cl.$^5$ ................................................. H04J 3/06
[52] U.S. Cl. ............................... 370/100.1; 370/105.1
[58] Field of Search ................... 370/105.1, 100.1, 13, 370/110.1, 105.5; 375/106, 107, 111, 113, 119, 120; 379/9

[56] References Cited

U.S. PATENT DOCUMENTS

| | | | |
|---|---|---|---|
| 3,384,821 | 5/1968 | Beck | 375/119 |
| 3,962,541 | 6/1976 | Seidel | 375/120 |
| 4,002,845 | 1/1972 | Kaul et al. | 370/105.1 |
| 4,744,081 | 5/1988 | Buckland | 370/105.1 |
| 4,876,683 | 10/1989 | Sazuki | 370/105.1 |
| 4,953,195 | 8/1990 | Ikemori | 370/13 |

Primary Examiner—Douglas W. Olms
Assistant Examiner—Alpus H. Hsu
Attorney, Agent, or Firm—Finnegan, Henderson, Farabow, Garrett and Dunner

[57] ABSTRACT

A private branch exchange includes an oscillator for generating a reference clock defining the transmission frequency of a digital network, a clock generating circuit for generating a clock, whose frequency is slightly higher than that of the reference clock, in synchronization with the clock extracted from the digital network, and a selector which monitors whether or not the clock generating circuit is in a state in which it can operate properly, selects the output of the clock generating circuit when it is normal or the output of the oscillator when it is abnormal, and applies the selected output as a drive clock to a time-division switch for performing time-division multiplex transmission while keeping frame synchronization with the digital network. The clock generating circuit comprises an oscillator for generating a clock of a frequency which is slightly higher than that of the reference clock to such an extent as to allow the frame synchronization, and a gate circuit which is enabled in synchronization with the clock extracted from the digital network and disabled upon completion of the exchange of one-frame-signal to provide the output of the oscillator to the selector as a drive clock.

11 Claims, 9 Drawing Sheets

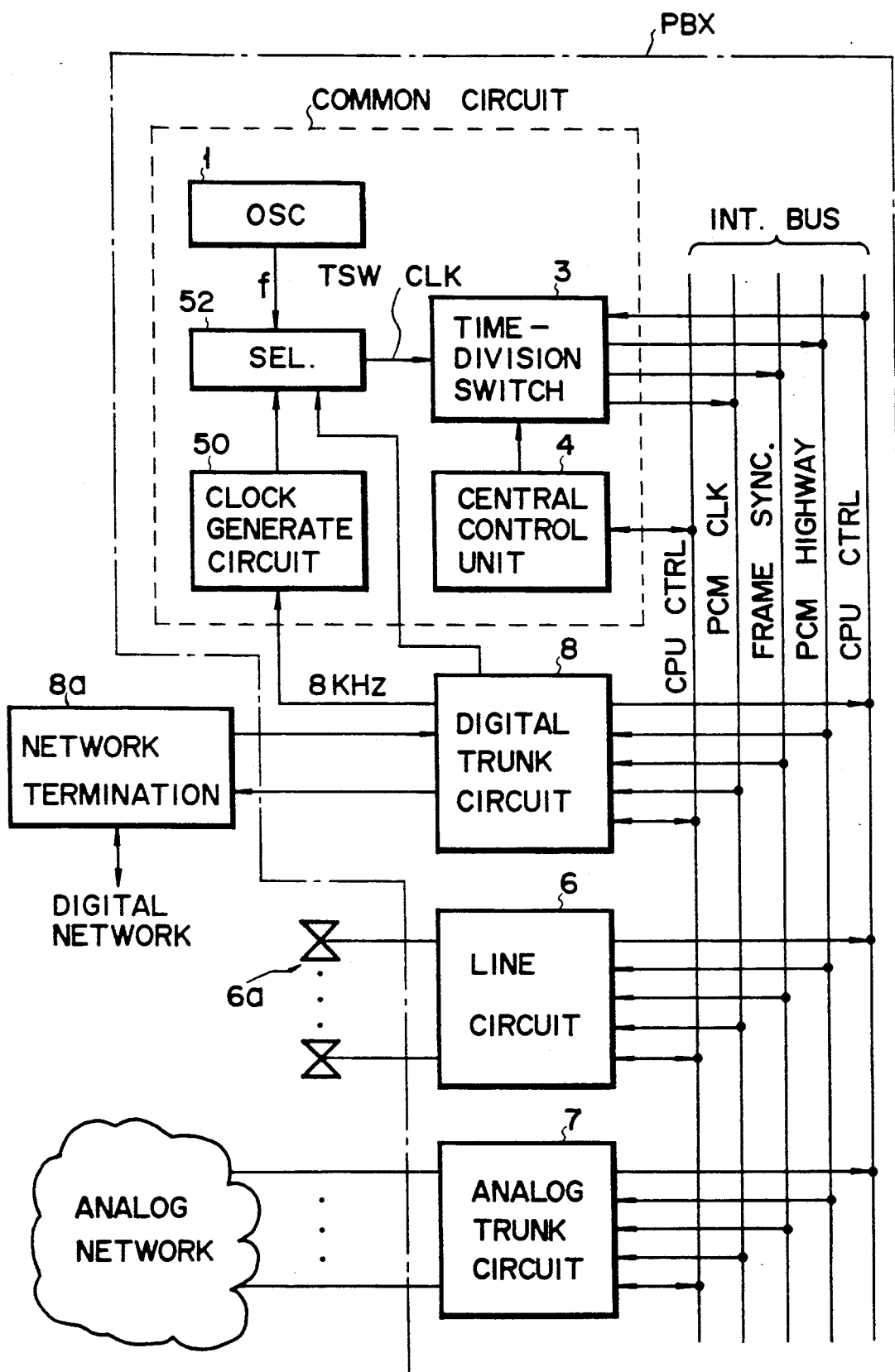
F I G. 4

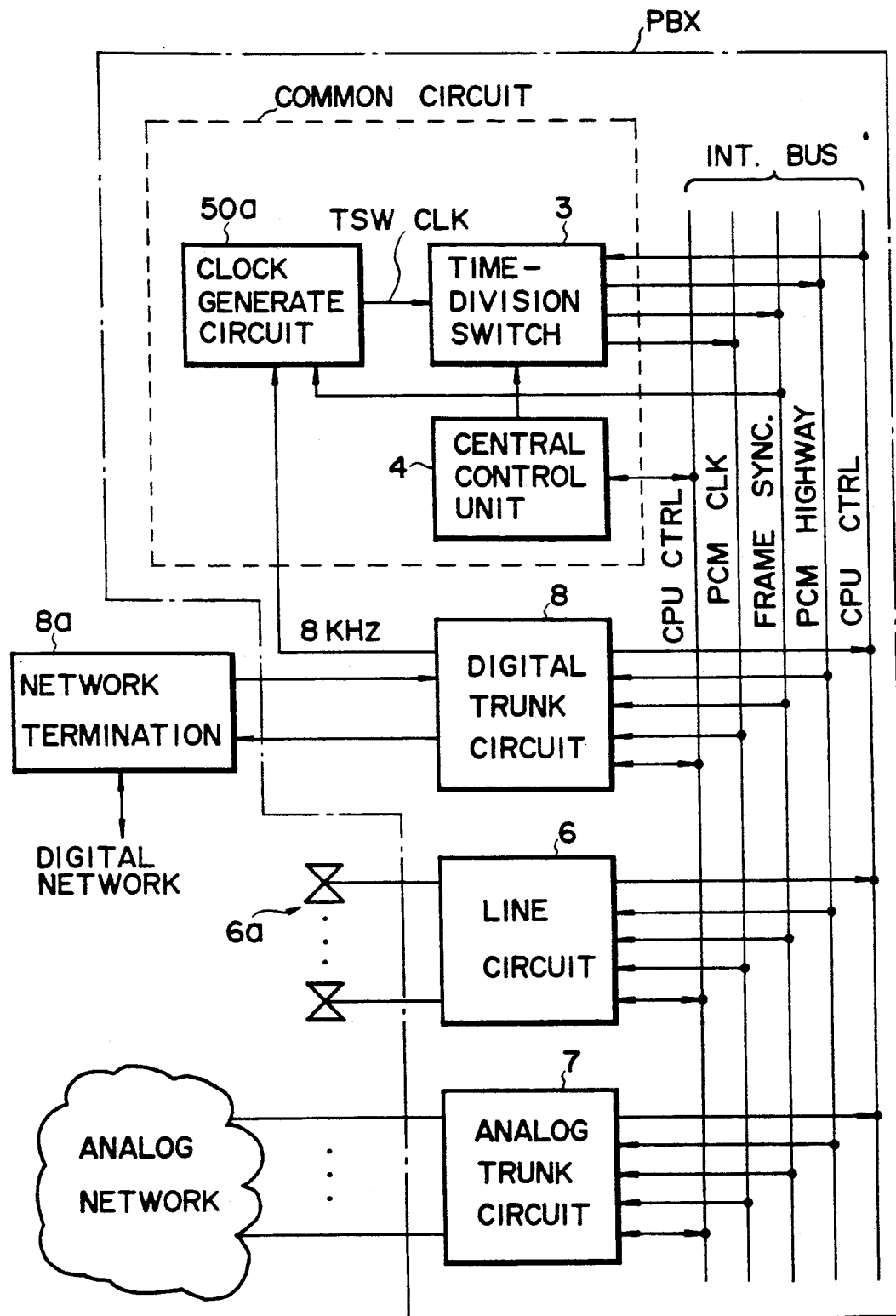
F I G. 7

ELECTRONIC EXCHANGE APPARATUS SYNCHRONIZED WITH DIGITAL NETWORK

BACKGROUND OF THE INVENTION

1. Field of the Invention

The present invention relates to an electronic exchange apparatus for a digital network such as an Integrated Service Digital Network (ISDN).

2. Description of the Related Art

With the advance of communication technology and diversification of communication systems, various types of communication network systems have been developed recently. As one of them, there is the ISDN. The ISDN provides communication services such as telephone service, data communication, facsimile service and so on over the same digital network. For line exchange in a communication system using the ISDN, there is the need for an exchange adapted for the ISDN to which a digital line exchange network, a packet exchange network, a common channel signaling system network and so on are connected. To the ISDN exchange are further connected terminal equipments such as telephone sets, facsimile equipment, voice mail equipment, etc. through a subscriber line network. A plurality of communication channels are time-division multiplexed for each of subscriber lines, and the communication channels are selectively used for communication between terminals. The specifications of the user-network interface of the ISDN are determined as follows.

The interface is classified according to its channel configurations into basic rate interface, primary rate interface, etc. For instance, in the basic rate interface of which transmission rate is 192 Kbps, two 64-Kbps B channels and one 16-Kbps D channel are time-division multiplexed to transmit data or sound. With one of primary rate interfaces (the primary rate B channel interface of which transmission rate is 1544 Kbps), 23 B channels and one D channel of 64 Kbps are multiplexed. Here the B channel refers to an information transferring channel used by user for communication, and the D channel refers to a line switching signaling channel, which is also used as a packet information channel.

In recent years the research and development of communication devices adapted for the ISDN have been conducted energetically, and moreover the activities for adapting a private branch system including a private branch exchange (PBX) to the ISDN are also vigorous so as to implement high-grade sound and data integrated services. A prior example of the private branch exchange accommodated to the ISDN and including digital trunks for ISDN (which are configured as cards) will be described hereinafter.

As shown in FIG. 1, the private branch exchange is basically formed of a line circuit 6 to which a plurality of extension telephones (standard telephone sets, multi-functional telephone sets, etc.) 6a are connected, an analog trunk circuit 7 to which an analog network is connected, and a digital trunk circuit 8 including S interface, T interface, U interface and so on and, to which circuit 8 a digital network such as an ISDN is connected through a network termination 8a. Though not shown, each of line circuit 6 and analog trunk circuit 7 includes a PCM codec operated in response to a PCM clock. Since line circuit 6 and trunk circuits 7 and 8 are each usually disposed on a printed circuit board, they are called the line card and the trunk card. Each of line circuit 6 and trunk circuits 7 and 8 may be provided in plural as needed. A common circuit for controlling line circuit 6 and trunk circuits 7 and 8 for exchange operation includes a time-division switch 3 for performing time-division exchange of internal bus lines in order to exchange PCM data such as sound or data to and from line circuit 6 and trunk circuits 7 and 8 in channel units (one channel comprises 8 bits, and one frame comprises 32 channels) and time-division multiplexes the PCM data and a central control unit 4 comprising a CPU for controlling various operations including the exchange operation. The internal bus lines comprise a CPU control (CTRL) bus, a PCM highway, a frame sync. signal bus, a PCM clock (CLK) bus and a CPU control bus.

Time-division switch 3 requires a clock, i.e., a TSW clock for time-division multiplexing the PCM data. Generally the frequency f of the TSW clock is set at an integral multiple of 64 KHz which corresponds to a channel transmission rate of 64 Kbps. Here f is set at $f = 12.288$ MHz ($= 64$ KHz $\times 192$). To produce the TSW clock in synchronization with the operation of the digital network, digital trunk circuit 8 extracts 8-KHz clock from a carrier signal of the digital network and applies it to a PLL (phase locked loop) circuit 5, which multiplies the frequency of the extracted clock by 1536 to produce a clock of 12.288 MHz. The 12.288-MHz clock from PLL circuit 5 is usually used as the TSW clock. However, in order for time-division switch 3 to be in operation in case where the output frequency of PLL circuit 5 is deviated because of some failure, an auxiliary oscillator 1 is provided which produces a clock of the same frequency f. One of the outputs from PLL circuit 5 and oscillator 1 is selected by a selector 2 to supply the TSW clock to time-division switch 3. Selector 2 monitors PLL circuit 5 so as to select its output when its output frequency is correct or the output of oscillator 1 when it is not correct.

In FIG. 2 there is shown a block diagram of digital trunk circuit 8. The PCM clock line, PCM highway (transmission, reception) and frame sync. signal line of the internal bus lines are connected to an elastic buffer 9. Elastic buffer 9 is a buffer for suppressing jitters or slips of the PCM clocks, transmit and receive signals over the PCM highway, and the frame sync. signal. Buffer 9 is connected to network termination 8a via digital network interface 10 so as to transmit and receive signals. Interface 10 is connected to a control CPU 11 which is the control center of digital trunk circuit 8. A carrier signal obtained from the digital network through interface 10 is applied to a clock extractor 12 so that a clock of 1.544 MHz is extracted. The clock is, in turn, applied to a mod-193 counter (divide-by-193 circuit) 13 to produce the clock of 8 KHz which is applied to PLL circuit 5.

In such an arrangement, digital trunk circuit 8 communicating with the digital network sends and receives signaling information and PCM information such as sound signals by digital network interface 10 under the control of control CPU 11 in synchronization with a time-division control signal, e.g., the frame sync. signal provided from time-division switch 3. The 8-KHz clock obtained by clock extractor 12 and counter 13 is sent to PLL circuit 5 so that the TSW clock used in a normal operation is produced. That is, so long as digital trunk circuit 8 operates normally, PLL circuit 5 operates in synchronization with the carrier signal sent from the digital network. Hence, the output of PLL circuit 5 is normal and selector 2 selects the output of PLL circuit 5 so that time-division switch 3 operates on the basis of the output of PLL circuit 5. Time-division switch 3 thus responds to the TSW clock to produce predetermined control signals including the frame sync. signal.

The input and output signals of time-division switch 3 are shown in FIG. 3. The TSW clock of 12.288 MHz are divided by 1536 to produce a clock of 8 KHz. The frame sync. signal is obtained based on the 8 KHz clock, which sync. signal has negative pulses with an interval of 125 μs therebetween. The PCM clock start to output in synchronization with the first rising edge of the TSW clock after the falling edge of the frame sync. signal. The PCM clock (2.048 MHz) is obtained by dividing the TSW clock of 12.288 MHz by six. The PCM highway transmits and receives data one bit at a time in synchronization with the PCM clock.

When trunk circuit (card) 8 is unplugged or when a failure occurs in the digital network or trunk circuit 8, the 8-KHz clock is not obtained from trunk circuit 8. PLL circuit 5 will then fail to provide the predetermined output frequency or to provide the output itself. In this case as well, upon detection of abnormality in the output of PLL circuit 5 selector 2 switches connection to time-division switch 3 from PLL circuit 5 to oscillator 1 so as not to stop the supply of the TSW clock to switch 3. It can thus be seen that even when PLL circuit 5 is abnormal, time-division switch 3 is supplied with the output of oscillator 1.

The reason why the output of PLL circuit 5 is used when digital trunk circuit 8 operates properly is to establish phase synchronization between the operation frequency of the exchange and the carrier signal in the digital network. For example, in the primary rate B channel interface the transmission rate of data from the digital network is 1.544 Mbps, and 24 channels, each of 64 Kbps, are multiplexed. That is, in the private branch exchange the PCM data for each of the channels is rewritten at 125-μs intervals in synchronization with the frame sync. signal with a cycle of 125 μs as shown in FIG. 3, and if the private branch exchange is not adapted for a special purpose, the transmission rate per channel over the internal PCM highway is also 64 Kpbs. The transmission and reception of data over the PCM highway must be performed by switching time-division switch 3 with the TSW clock in phase synchronization with the carrier signal in the digital network. However, where time-division switch 3 is operated in response to the clock of frequency f obtained from oscillator 1 of the exchange, a subtle difference between the transmission rate of the PCM data in the exchange and that in the digital network will occurs inevitably, failing to establish the phase synchronization between the exchange and the digital network. In such a case a slip will occur in data transmission in the exchange and the digital network. For example, when the exchange is higher than the digital network in data transmission rate, there is a possibility that the exchange may access same data two times before new data is transmitted from the digital network. On the other hand, when the exchange is lower than the digital network in data transmission rate, there is a possibility that new data ma be sent from the digital network before the exchange accesses old data. The foregoing relates to the case of reception of data. In the case of data transmission as well, the same phenomenon, or the slip occurs.

As described above, the exchange adapted to the ISDN requires a PLL circuit which is operated in synchronization with the clock extracted from the carrier signal transmitted over the digital network in order to avoid occurrence of the slip. The exchange itself disadvantageously becomes expensive and large because of provision of the PLL circuit. For example, in order to support the channel system of a time-division switch having over 300–500 ports with one-stage nonblocking system, the time-division switch requires a high frequency clock of 10 MHz or more as the TSW clock therefor. If the PLL circuit were formed of a digital circuit, a quartz oscillator of the order of 100 MHz would be required. Thus, an analog PLL circuit is generally used which uses a voltage-controlled crystal oscillator. This inevitably makes the exchange bulky and expensive. Moreover, the PLL circuit takes time in frequency tracking. This can adversely affect high speed operation and cause malfunctions due to noise, thus causing low reliability of the exchange.

SUMMARY OF THE INVENTION

It is accordingly an object of the present invention to provide an electronic exchange apparatus for a digital network which permits coincidence or synchronize in signal transmission rate between the exchange apparatus and the digital network without the use of a PLL circuit and is thus small in size, inexpensive, and highly reliable.

It is another object of the present invention to provide an electronic exchange apparatus including a clock generating circuit for generating a reference clock, which is phase locked with a digital network, for a time-division control, an auxiliary clock oscillator which is used in stead of the clock generating circuit when it is abnormal in operation, in which one of the clock generating circuit and the auxiliary clock oscillator is selected in a simple construction.

The first object of the present invention is realized by an electronic exchange apparatus comprising a first oscillator for generating a reference clock of the exchange apparatus; clock extractor for extracting a clock of a transmission frequency from a digital network; a clock generating circuit responsive to the extracted clock for generating a clock of a frequency which is higher than the reference clock, and yet allows synchronization between the exchange apparatus and the digital network, the clock generating circuit comprising a second oscillator for generating the clock which is higher in frequency than the reference clock, a gate circuit for allowing the output of the second oscillator to pass therethrough in synchronization with the extracted clock, and a gate control circuit for counting the number of output pulses of the gate circuit and disabling the gate circuit to inhibit the passage of the output of the second oscillator when a predetermined number of output pulses are counted; a selector for monitoring the operation of the digital network or the clock extractor to select the output of the clock generating circuit when the digital network or the clock extractor is normal in operation or to select the output of the first oscillator when the digital network or the clock extractor is abnormal in operation; and a time-division switch operating on the basis of the clock selected by the selector to perform a time-division multiplex transmission while keeping frame synchronization.

The other object of the present invention is realized by an electronic exchange apparatus comprising a clock extractor for extracting a clock of a transmission frequency from a digital network; a clock generating circuit responsive to the extracted clock for generating a clock of a frequency which is higher than the reference clock, and yet allows synchronization between the exchange apparatus and the digital network, the clock generating circuit comprising an oscillator for generating the clock, a gate circuit for allowing the output of the oscillator to pass therethrough in synchronization with the extracted clock, and a gate control circuit responsive to a frame synchronization signal for disabling the gate circuit to inhibit the passage of the output of the oscillator; and a time-division switch responsive to the output of the clock generating circuit for producing the frame synchronization signal and performing time-division multiplex transmission while keeping frame synchronization.

BRIEF DESCRIPTION OF THE DRAWINGS

FIG. 4 is a block diagram of a private branch exchange for ISDN according to a first embodiment of the present invention;

FIG. 7 is a block diagram of a private branch exchange for ISDN according to a second embodiment of the present invention;

DETAILED DESCRIPTION OF THE PREFERRED EMBODIMENTS

Figure 1:
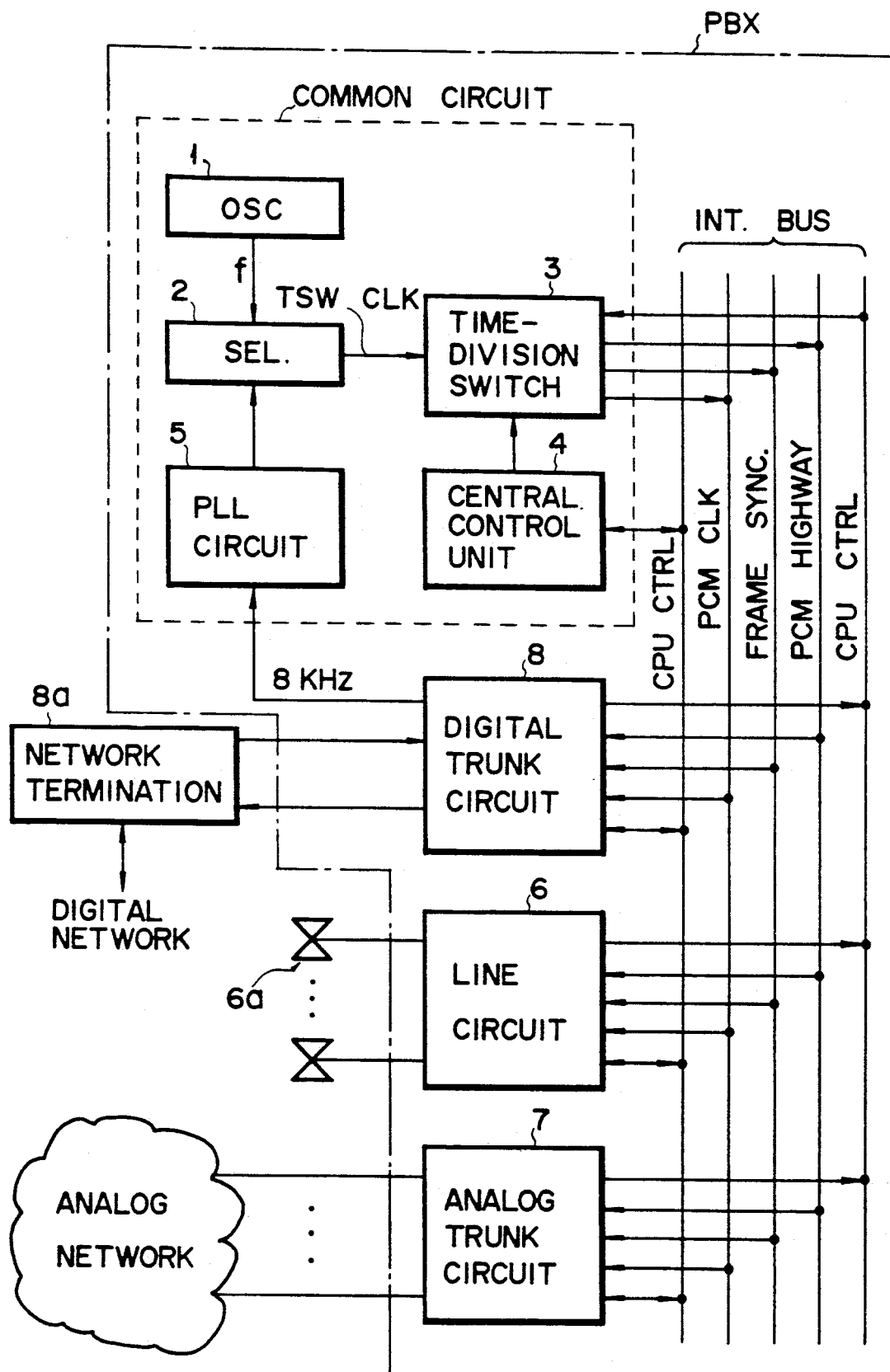
FIG. 1 is a block diagram of a conventional private branch exchange for ISDN.

Referring now to FIG. 4, a private branch exchange embodying the present invention includes, as in the arrangement of FIG. 1, line circuit 6 to which a plurality of extension telephone sets (standard telephone sets, multifunctional telephone sets and so on) 6a are connected, analog trunk circuit 7 to which an analog network is connected, and digital trunk circuit 8 having S interface, T interface and U interface to which a digital network such as ISDN is connected via network termination 8a. Line circuit 6 and trunk circuits 7 and 8 each are assembled on circuit boards and so they are called the line card and trunk cards. Each of line circuit 6 and trunk circuits 7 and 8 may be increased in number as needed.

A common circuit adapted to control line circuit 6 and trunk circuits 7 and 8 for exchange operation includes time-division switch 3 for switching internal bus lines on a time-division basis to exchange and time-division multiplex PCM data such as sound or data received from or sent to line circuit 6 and trunk circuits 7 and 8 in channel units, and central control unit 4 comprising a CPU for controlling the exchange operation and so on. TSW clock of frequency f is supplied to time-division switch 3 so that switch 3 can receive data from or send data to line circuit 6 and trunk circuits 7 and 8 in channel units and multiplex the data on a time-division basis for transmission. In the present embodiment, as in the conventional arrangement of FIG. 1, an auxiliary oscillator 1 is provided which generates the clock of frequency f used in an abnormal operation. However, the present embodiment is different from the conventional arrangement in that a clock generating circuit 50 is provided in place of PL circuit 5, which generates a clock serving as the TSW clock used in a normal operation, on the basis of 8-KHz clock provided from digital trunk circuit 8.

Moreover, in the present embodiment, selector 52 for selecting oscillator 1 or clock generating circuit 50 is adapted, in response to a failure detection signal output from digital trunk circuit 8 representing normality or abnormality of the digital network or trunk circuit 8 itself, to select the clock generated by clock generating circuit 50 when the failure detection signal represents normality or select the clock generated by oscillator 1 when it represents abnormality.

Figure 5:
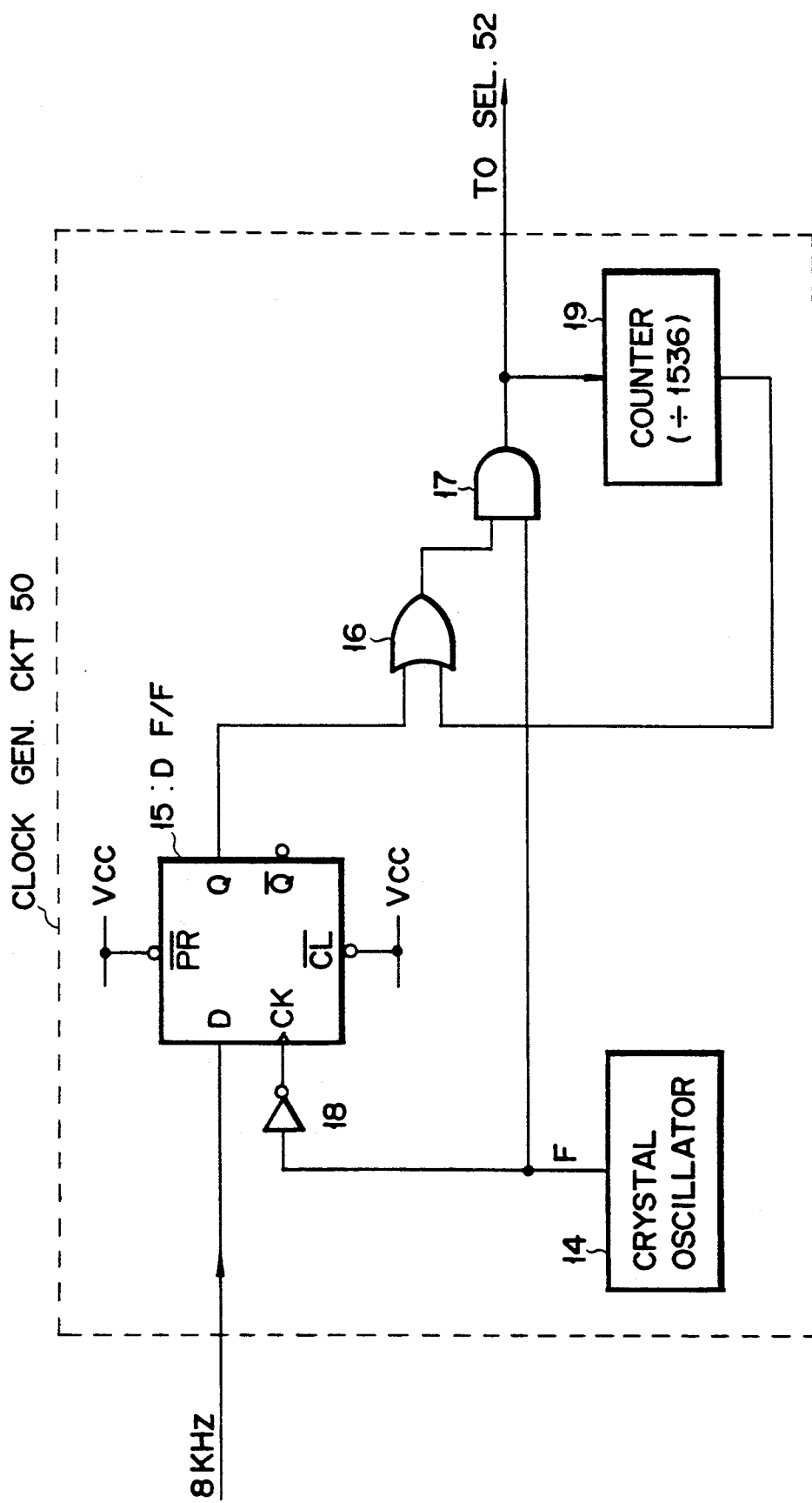
FIG. 5 is a block diagram of the clock generating circuit of FIG. 4.

FIG. 5 shows a specific arrangement of clock generating circuit 50. A crystal oscillator 14 is provided which generates a reference clock of a predetermined frequency F. As will be described later, the reference clock is applied to selector 52 via an AND gate 17 as the TSW clock used in a normal operation. Strictly speaking, the frequency F is not equal to the frequency f (12.288 MHz) required of the TSW clock but is set somewhat higher than it. It is to be noted that the frequency F is merely deviated from the frequency f within a range in which no synchronization is lost between the digital network and the exchange even when time-division switch 3 is operated by the TSW clock of frequency F.

The 8-KHz clock output from digital trunk circuit 8 is applied to an input terminal D of a D type flip-flop 15. Flip-flop 15 has its input clock terminal CK supplied with the output clock of crystal oscillator 14 via an inverter 18. Thus, flip-flop 15 provides the 8-KHz clock in synchronization with the reference clock output from crystal oscillator 14. An output signal at output terminal Q of flip-flop 15 is applied to AND gate 17 via an OR gate 16. AND gate 17 is also supplied with the output clock of crystal oscillator 14 so that the output of crystal oscillator 14 serving as the TSW clock is applied to selector 52 in synchronization with the 8-KHz clock from digital trunk circuit 8. The output of AND gate 17 is also applied to OR gate 16 via a mod-1536 counter 19 serving as a frequency divider-by-1536. The output of counter 19 goes to a "HIGH" level upon detecting the first falling edge of the output of AND gate 17 and goes to a "LOW" level upon counting 1536 output pulses of AND gate 17. Thus, counter 19 produces the "LOW" level output for every 1/8.0078125 (ms). Therefore, the counter 19 outputs a pseudo frame sync. signal stopping the generation of TSW clock as described later.

Figure 6:
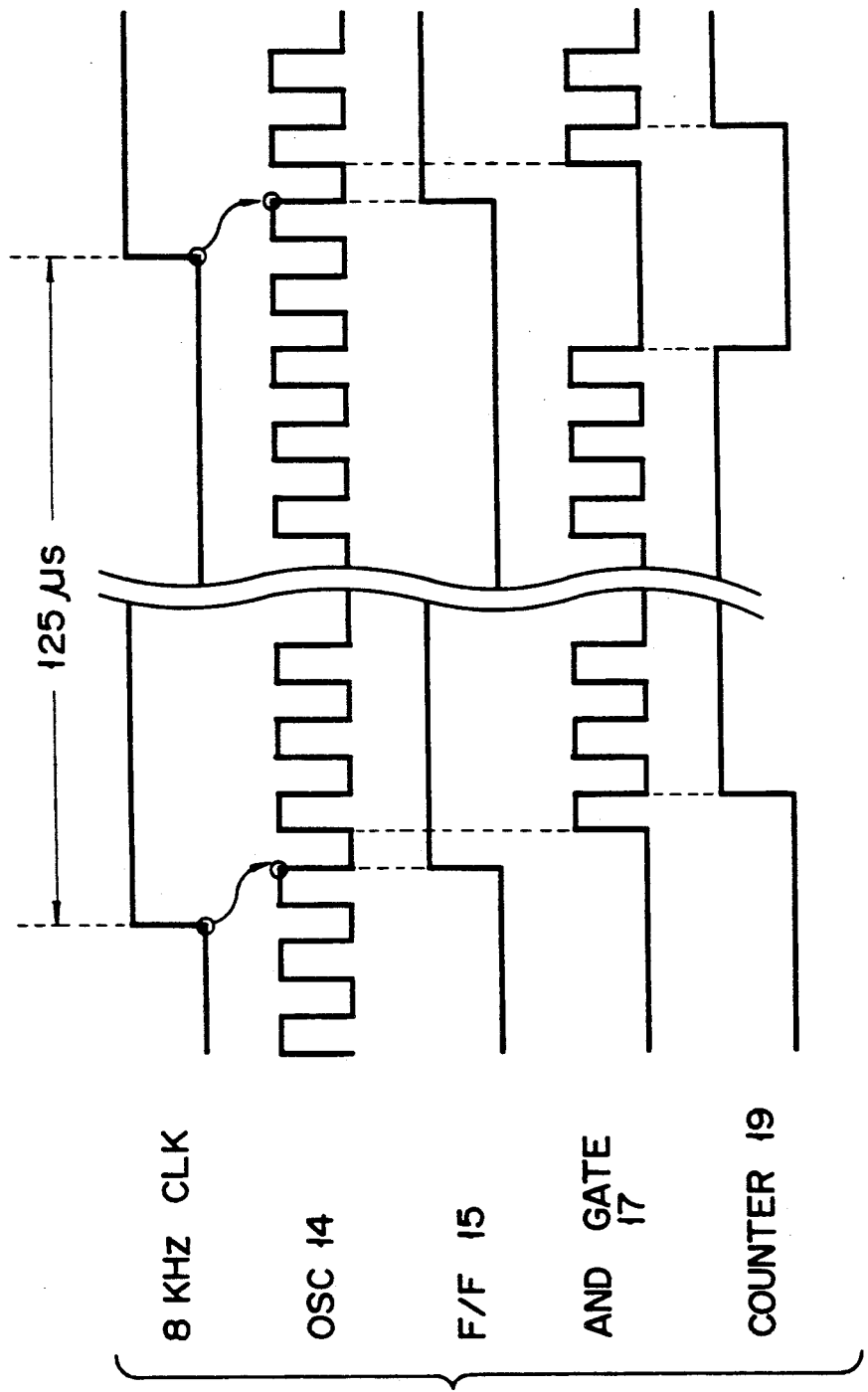
FIG. 6 is a timing chart explanatory of the operation of the first embodiment of FIG. 4.

In operation, the 8-KHz clock goes from "L" level to "H" level at 125-μs intervals as shown in FIG. 6. Since the inverted output of crystal oscillator 14 is applied to flip-flop 15, flip-flop 15 changes its output state from "L" level to "H" level in response to the first fall of the output of crystal oscillator 14 after the rise of the 8-KHz clock to "H" level. The "H" level output of flip-flop 15 enables TSW clock transmit/stop control AND gate 17 so that the output of crystal oscillator 14 is sent to selector 52 as the TSW clock. In this way the output of flip-flop 15 for determining the start timing of the TSW clock transmission is synchronized with the output of crystal oscillator 14. When digital trunk circuit 8 or the digital network is in order, the TSW clock from oscillator 14 is applied to time-division switch 3 via selector 52 so that time-division switch 3 operates properly. The TSW clock continues to be applied to selector 52 as long as the output of flip-flop 15 or counter 19 is at "H" level.

Since the frequency F of oscillator 14 is somewhat higher than the frequency f of the TSW clock, counter 19 counts 1536 clock pulses of frequency F within 125 μs to switch its output to "L" level. Thereafter, AND gate 17 is disabled because the output Q of flip-flop 15 has already been at "L" level. Consequently the supply of the TSW clock to selector 52 is stopped. This state continues until the output of flip-flop 15 goes to "H" level. In this way the output of counter 19, which determines the stop timing of the TSW clock transmission for one frame, is very close in frequency to the frame sync. signal so that the TSW clock output from AND gate 17 is phase locked with the digital network.

When trunk circuit (card) 8 is unplugged or the digital network or trunk circuit 8 is out of order, clock generating circuit 50 cannot operate properly because it is not supplied with the 8-KHz clock. For this reason, when the failure detection signal output from digital trunk circuit 8 represents the abnormality of the digital network or trunk circuit 8, selector 52 provides the clock generated by oscillator 1 to time-division switch 3 as the TSW clock.

Next, the frequency F of crystal oscillator 14 will be explained. To establish synchronization between the TSW clock and the 8-KHz clock, the following relationships are needed. That is, assuming a frequency error of the carrier of the digital network to be ±ε₁ ppm and the frequency of the TSW clock for driving time-division switch 3 to be f, the frequency F of crystal oscillator 14 should be set such that $$(125/2)\mu s < \frac{1}{F} < \frac{1}{f(1 + |\epsilon_1|)}.$$

It is assumed here that the duty ratio of the 8-KHz clock is 50%. However, since F also involves an error of ±ε₂ ppm, $$(125/2)\mu s < \frac{1}{F(1 - |\epsilon_2|)} < \frac{1}{f(1 + |\epsilon_1|)}.$$

Generally the frequency f of the TSW clock is an integral multiple of 64 KHz and 12.288 MHz is used in the present case. Thus, assuming that ε₁ = ±100 ppm and ε₂ = ±100 ppm, the oscillation frequency of crystal oscillator 14 has only to be 12.30 MHz or above. Assuming that F = 12.3 MHz, the output of counter 19 goes to "L" level at about 124.878-μs intervals. Since ε₁ and ε₂ are very small, f = F will result. Hence, if the frequency F of crystal oscillator 14 is set to f (1 + |ε₁| + |ε₂| + margin) and the time-division switch 3 is operated thereby, the digital network and the exchange will not be out of synchronization in signal transmission.

Figure 2:
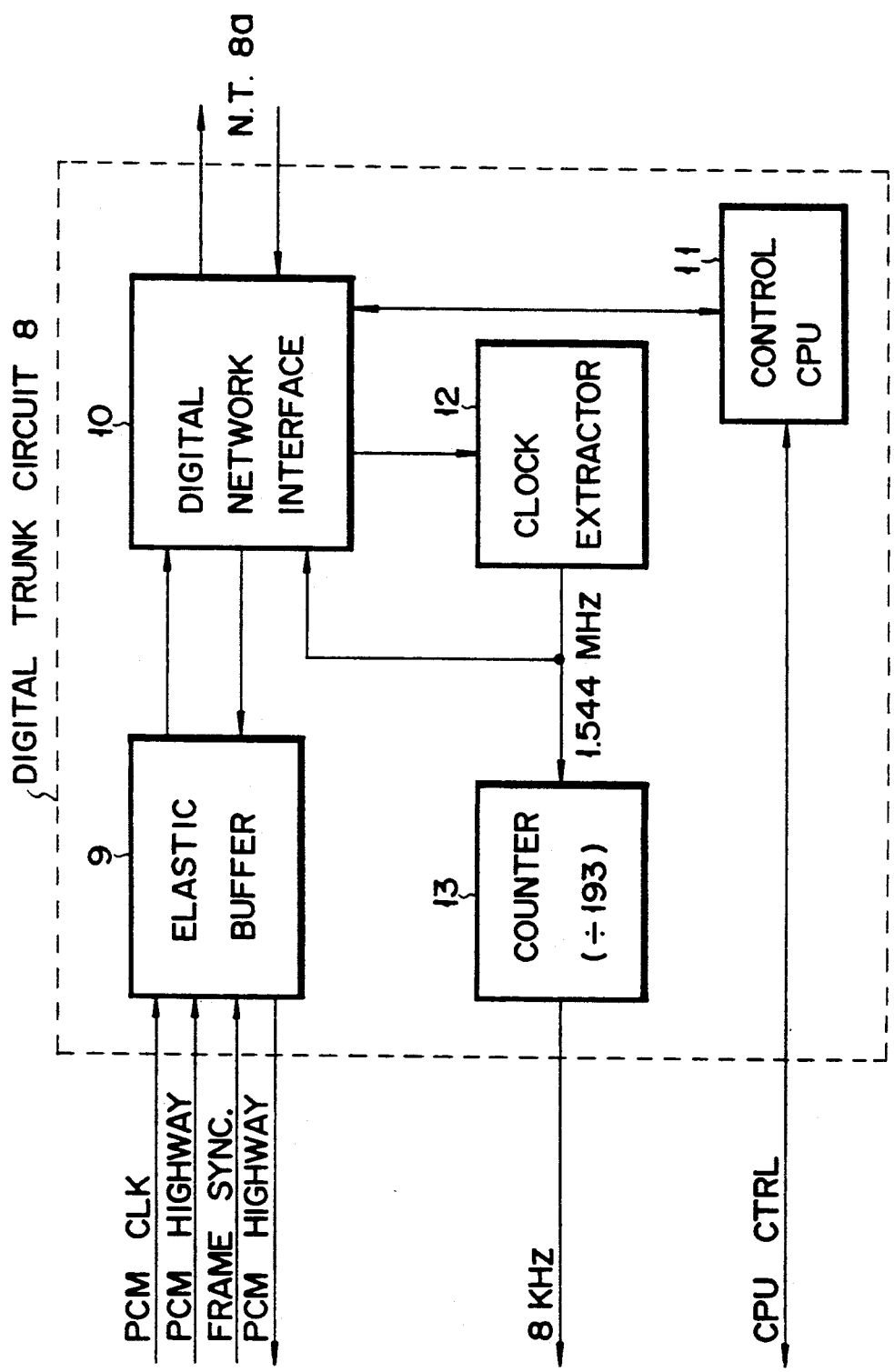
FIG. 2 is a block diagram of the digital trunk circuit of FIG. 1.
Figure 3:
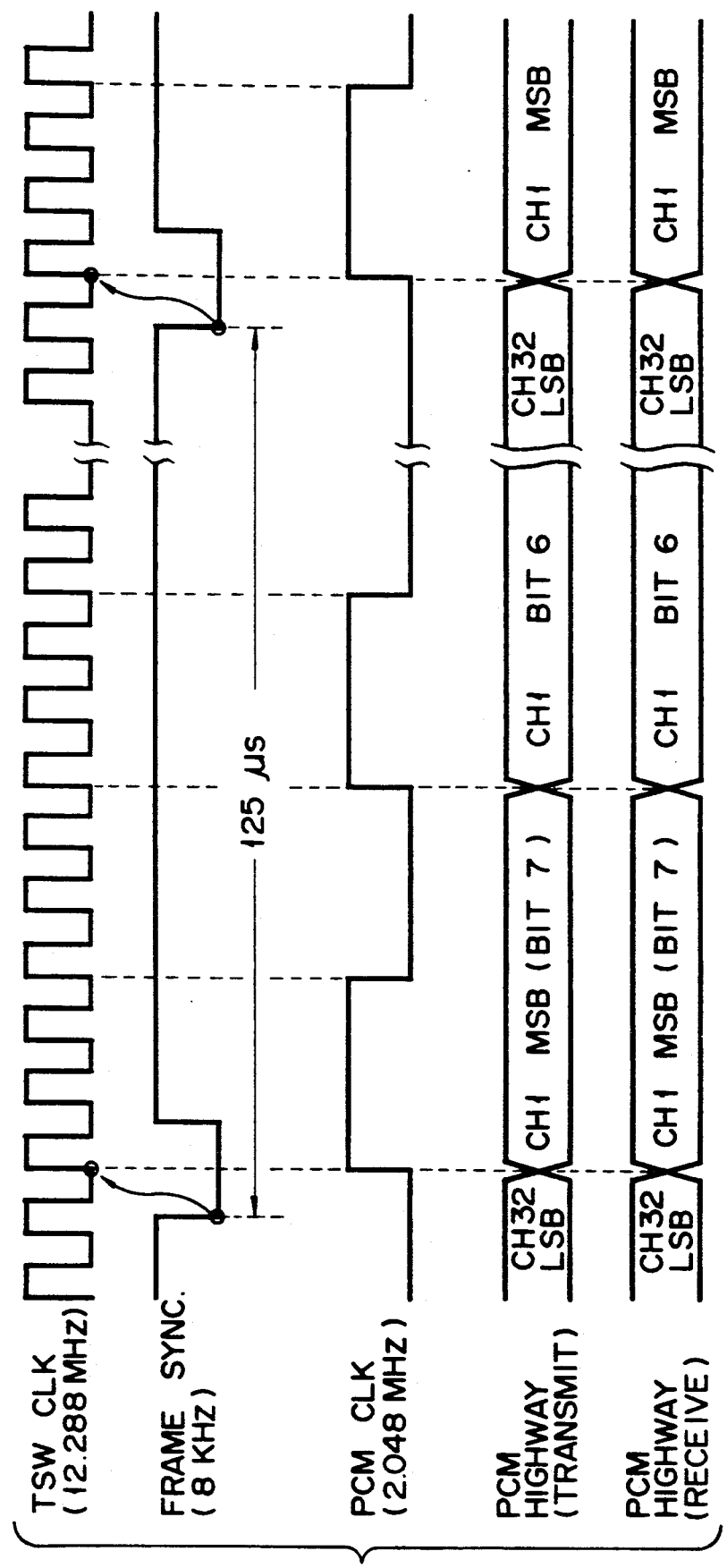
FIG. 3 is a timing chart explanatory of the operation of the exchange of FIG. 1.

If the output frequency F of crystal oscillator 14 is set to 12.3 MHz, then extra 1.5 TSW clock pulses will be generated within 125 μs. In this case, by controlling AND gate 17 with the output from counter 19 to stop two clock pulses in three frames, it will be possible to maintain the synchronization between the digital network and the exchange. However, jitters will occur in transmission of PCM data between digital trunk circuit 8 and the PCM highway of the exchange. Even when a PLL circuit is used to generate the TSW clock as in the prior art, jitters will occur because of possible phase errors, but they can be absorbed by elastic buffer 9 shown in FIG. 2. In the present embodiment as well, jitters of such a level can likewise be absorbed.

With respect to the sound data transmitted on a time-division basis, PCM data is converted to a sound signal or the sound signal is converted to PCM data by a PCM codec not shown. The effect of the output frequency F of crystal oscillator 14 set as described above on the operation of the PCM codec will be considered. The sampling frequency is 125 μs. This is the case with the prior art. The variation in speed of operation of a parallel to serial converter and a serial to parallel converter of the PCM codec which are adapted to interface with the PCM highway will be about +1000 ppm at most when the frequency F of crystal oscillator 14 is set at the above value. This will generally cause the PCM codec to work well according to its specifications.

According to the first embodiment of the present invention, as described above, in an exchange including auxiliary oscillator 1 for generating a reference clock, clock generating circuit 50 responsive to a clock having the same frequency as a frame sync. signal extracted from a digital network to generate a clock of the same frequency as the reference clock, selector 52 for monitoring whether or not clock generating circuit 50 is in a state in which it can operate properly and for selecting the output of clock generating circuit 50 when it operates properly or the output of auxiliary oscillator 1 when circuit 50 operates abnormally, and time-division switch 3 responsive to the output of the selector 52 to effect time-division multiplex transmission of signals while keeping frame synchronization with the digital network, clock generating circuit 50 is formed of oscillator 14 for generating a clock whose frequency is higher than the transmission frequency in the digital network to such an extent as to keep the time-division switch in synchronization with the digital network, and AND gate 17 for providing the output of oscillator 14 to selector 52 as its drive clock in synchronization with the clock extracted from the digital network. Since time-division switch 3 is adapted to operate faster than the transmission rate of PCM data transmitted over the digital network, the operation of time-division switch 3 is disabled when the PCM data are rewritten and is started in response to the 8-KHz clock, no slip occurs and moreover the need for a PLL circuit can be eliminated. Oscillator 14 has only to generate a drive clock of the order of the speed of operation of time-division switch 3. This prevents the apparatus from becoming large in size and the reliability from becoming lowered in cooperation with the elimination of the need for an analog PLL circuit using a high frequency oscillator.

Figure 8:
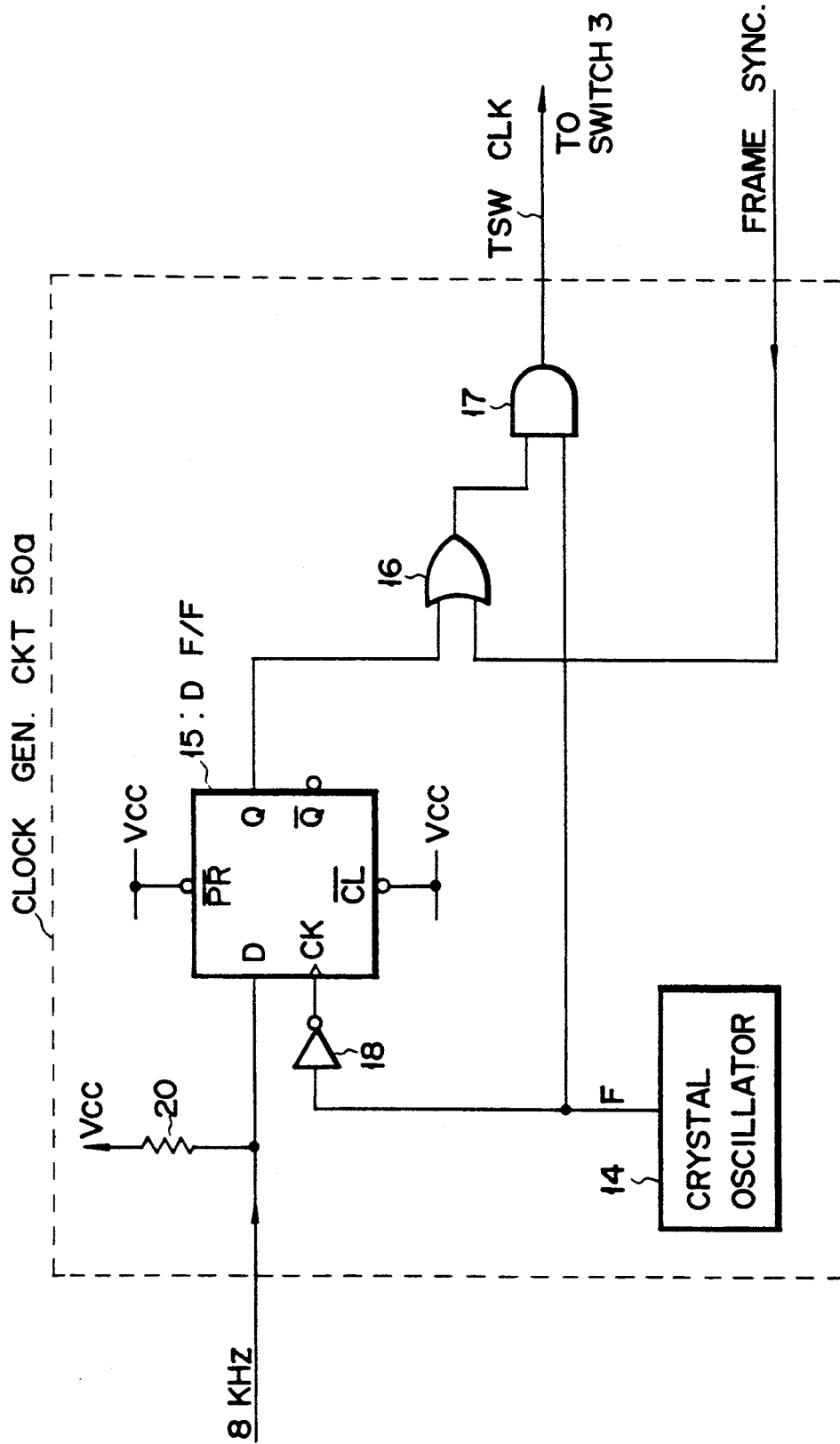
FIG. 8 is a block diagram of the clock generating circuit of FIG. 7.

Referring now to FIG. 7, there is shown a block diagram of a private branch exchange according to a second embodiment of the present invention. The second embodiment is similar to the first embodiment but different in that oscillator 1 and selector 52 are excluded and hence only a clock generating circuit 50a is coupled to time-division switch 3 and supplied with a frame sync. signal. The failure detection signal also is not needed, which is supplied from digital trunk circuit 8 to selector 52 in the first embodiment. Thus, trunk circuit 8 becomes simpler in construction. The arrangement of clock generating circuit 50a is shown in FIG. 8, which is different from the first embodiment of FIG. 5 in that counter 19 is excluded, the frame sync. signal is applied to AND gate 17 via OR gate 16 instead and input D of flip-flop 15 is pulled up to supply voltage VCC. That is, oscillator 14 of clock generating circuit 50a serves also as oscillator 1 of the first embodiment. The other arrangements are identical to those of the first embodiment and thus description thereof is omitted.

In the second embodiment, since the frame sync. signal produced by time-division switch 3 on the basis of the TSW clock is used for controlling the generation of the TSW clock, the process of synchronizing the TSW clock to the 8-KHz clock differs according to the timing of generation of the frame sync. signal. That is, the frame sync. signal can be generated in two cases, one where the 8-KHz clock is at "H" level and the other where it is at "L" level.

Figure 9:
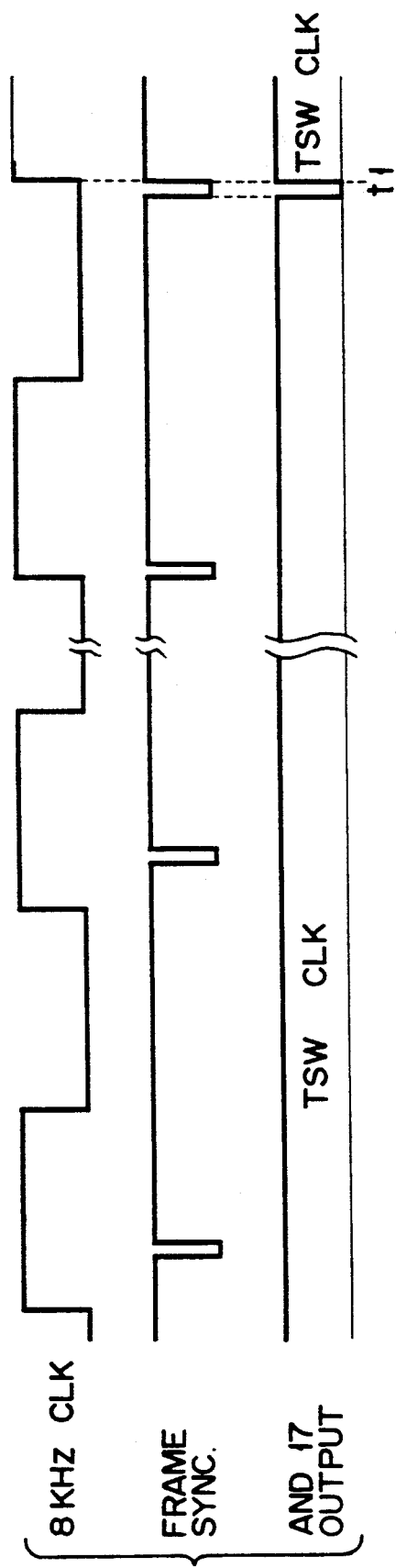
FIGS. 9 and 10 are timing charts representing the operations of the second embodiment of FIG. 7.

First, the case where the frame sync. signal goes active (to "L" level) when the 8-KHz clock is at "H" level is shown in FIG. 9. Since the generation of the TSW clock is not terminated in this condition, the frame sync. signal is generated at intervals shorter than 125 μs. Since the intervals between the two frame sync. signals become shorter, the timing of generation of the frame sync. signal is gradually advanced with respect to the 8-KHz clock, and the frame sync. signal will become generated when the 8-KHz clock is at "L" level after the lapse of a predetermined time. At this time, AND gate 17 is disabled so that the generation of the TSW clock terminates. This state continues up to time t1 at which the 8-KHz clock next goes to "H" level. At time t1, AND gate 17 is enabled to send out the TSW clock. After time t1 the TSW clock is sent out in synchronization with the 8-KHz clock.

Figure 10:
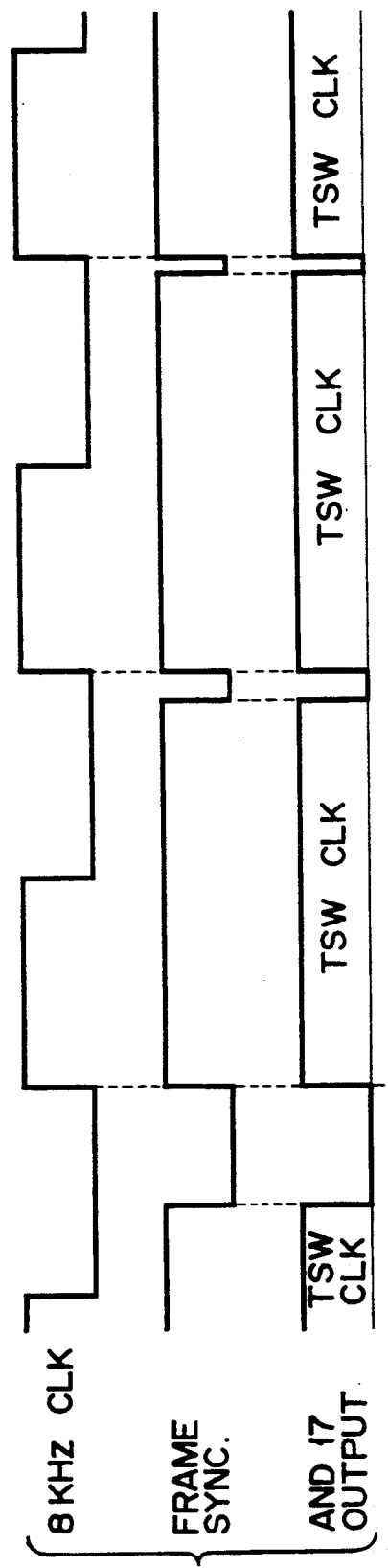

In FIG. 10, there is shown the case where the frame sync. signal goes active (to "L" level) when the 8-KHz clock is at "L" level. In this case, the transmission of the TSW clock is terminated at once. This state continues until the 8-KHz clock next goes to "H" level. Hence the synchronization is established at time t2 at which the TSW clock is next sent out. In this case, therefore, it will take about 62.5 μs at longest to enter the synchronization state from the start of operation. This is half the cycle period of 8-KHz clock. By the way, in the case of FIG. 9, the synchronization will be established within a time period given by $$\{62.5 \ \mu s/(125 \ \mu \times \epsilon)\} \times 125 \ \mu s \qquad (1)$$

where ε stands for an error or difference between the output of crystal oscillator 14 and the TSW clock. Assuming that the output frequency F of crystal oscillator 14 is 12.3 MHz, the driving frequency f for time-division switch 3 is 12.288 MHz, an error included in the digital network is ±100 ppm and an error included in frequency F is also ±100 ppm, since an error of +1000 ppm exists between F and f, ε is at least 800 ppm. In this example, it will take about 80 ms to enter the synchronization state as can be seen from the above formula. Such a waiting time offers no problem in practical use.

When trunk circuit (card) 8 is unplugged or when the digital network or trunk circuit 8 is out of order, the 8-KHz clock is not applied to clock generating circuit 50a. Then output Q of flip-flop 15 is always remained at "H" level because its input D is pulled up to supply voltage Vcc. As a result AND gate 17 is always enabled irrespective of the frame sync. signal, so that the output of oscillator 14 is sent out as the TSW clock as it is left asynchronous.

According to the second embodiment, as described above, clock generating circuit 50a adapted to generate the TSW clock in synchronization with a clock signal of the same frequency as the frame sync. signal extracted from the digital network, which circuit 50a is formed of oscillator 14 for generating a clock having a frequency which is higher than the transmission frequency in the digital network within a range to keep it in synchronization with the digital network, and AND gate 17 for providing the output of oscillator 14 to time-division switch 3 as the TSW clock in synchronizaion with the clock extracted from the digital network. Since time-division switch 3 is adapted to operate faster than the transmission rate of PCM data transmitted over the digital network, the operation of time-division switch 3 is disabled when the PCM data are rewritten and is started in response to the 8-KHz clock, no slip occurs and moreover the need for a PLL circuit can be eliminated. Moreover, AND gate 17 of clock generating circuit 50a provides the output of oscillator 14 as the TSW clock when the clock signal of the same frequency as the frame sync. signal is not extracted from the digital network. Hence the need for oscillator 1 and selector 52 is eliminated, thus making apparatus simple in construction and small in size.

According to the present invention, as described above, the time-division switch is raised in speed of operation and operated in synchronization with a clock which is generated at 125-μs intervals in response to a clock signal extracted from the digital network. Hence no slip occurs and moreover the synchronization can be established between the exchange and the digital network without the use of a PLL circuit. For this reason, there are obtained advantages that the synchronization circuit can be prevented from becoming large in size which would result from the use of the high-frequency drive clock for the time-division switch, or factors to lower the reliability of the exchange, such as tracking time due to the use of an analog PLL and malfunctions due to noise, can be eliminated.

What is claimed is:

1. An exchange for a digital network which transmits data at a predetermined data transmission frequency, comprising:

means for extracting a clock from the digital network, the clock having a period corresponding to a data frame period of the digital network;

oscillator means for generating a clocking signal output having a frequency F which is higher than the data transmission frequency of the digital network, wherein the frequency F of the clocking signal output satisfies the following relationship:

an active period of the extracted clock <

$$\frac{1}{F(1 - \epsilon_2)} < \frac{1}{f(1 + \epsilon_1)}$$

where f is the predetermined data transmission frequency, $\epsilon_1$ is an absolute value of a frequency error of a carrier signal in the digital network expressed in ppm, and $\epsilon_2$ is an absolute value of a frequency error of said oscillator means expressed in ppm;

gate means, synchronously enabled by the extracted clock, for gating the clocking signal output, so as to establish frame synchronization between the digital network and the exchange;

means, responsive to the gated clocking signal output, for exchanging data with the digital network at a predetermined frequency; and p1 gate control means for disabling said gate means upon completion of an exchange of the data in one data frame.

2. An exchange according to claim 1, wherein the frequency F of said oscillator means satisfies the following relationship:

$$F=f(1+\epsilon_1+\epsilon_2).$$

3. An exchange according to claim 2, wherein said extracting means includes means for extracting a clock having the same frequency as a frame sync. signal; and wherein said gate control means includes means for dividing the output frequency of said gate means by a frequency which approximates that of the frame sync. signal and means for supplying the output of the dividing means to the gate means.

4. An exchange according to claim 3, wherein said extracting means includes means for extracting a carrier signal from the digital network and means for dividing the frequency of the carrier signal by a frame sync. frequency.

5. An exchange according to claim 1, wherein the extracted clock is input to a flip-flop operating in synchronization with the output of said oscillator means, the output of the flip-flop enabling said gate means.

6. An exchange according to claim 1, wherein said predetermined exchanging means frequency divides the output of said gate means to produce a frame synchronization signal and a PCM clock signal.

7. An exchange for a digital network, comprising:
first oscillator means for generating an exchange reference clock;
means for extracting a clock corresponding to a transmission frequency of the digital network;
clock generating means, responsive to the extracted clock, for generating a clocking signal output having a frequency F which is higher than the reference clock, the clock generating means comprising second oscillator means for generating the clocking signal output having the frequency F which is higher than the reference clock, wherein the frequency F of the clocking signal output satisfies the following relationship:
an active period of the extracted clock <

$$\frac{1}{F(1-\epsilon_2)} < \frac{1}{f(1+\epsilon_1)}$$

where f is the frequency of the reference clock, $\epsilon_1$ is an absolute value of a frequency error of a carrier signal in the digital network expressed in ppm and $\epsilon_2$ is an absolute value of a frequency error of said clock generating means expressed in ppm;
gate means, synchronously enabled by the extracted clock, for gating the clocking signal output of the second oscillator means;
gate control means for counting gated clocking signal output pulses and for disabling aid gate means to inhibit the output of said second oscillator means when a predetermined number of gated clocking signal output pulses are counted, so as to establish frame synchronization between the digital network and the exchange;
selector means for monitoring the operation of at least one of the digital network and the extracting means, for determining whether the clock generating means generates a clocking signal output having frequency F, and for selecting the output of the clock generating means when it is determined that the clock generating means generates a clocking signal output having frequency F and for selecting the output of said first oscillator means when it is not determined that the clock generating means generates a clocking signal having frequency F; and
time-division switch means, responsive to the selector means for performing a time-division multiplex transmission while maintaining frame synchronization.

8. An exchange according to claim 7, wherein the frequency F satisfies the following relationship:

$$F=f(1+\epsilon_1+\epsilon_2).$$

9. An exchange for a digital network, comprising:
means for extracting a clock corresponding to a transmission frequency from the digital network;
clock generating means, responsive to the extracted clock, for generating a clocking signal output having a frequency F which is higher than the extracted clock, wherein the frequency F of the clocking signal output satisfies the following relationship:
an active period of the extracted clock <

$$\frac{1}{F(1-\epsilon_2)} < \frac{1}{f(1+\epsilon_1)}$$

where f is the frequency of the reference clock of the exchange, $\epsilon_1$ is an absolute value of a frequency error of a carrier signal in the digital network expressed in ppm, and $\epsilon_2$ is an absolute value of a frequency error of said clock generating means expressed in ppm, said clock generating means comprising;
oscillator means for generating the clocking signal output having a frequency F which is higher than the extracted clock,
gate means, synchronously enabled by the clock, for gating the clocking signal output of said oscillator means, and
gate control means, responsive to a frame synchronization signal, for disabling said gate means to inhibit the clocking signal output of said oscillator means, such that the gated clocking signal output establishes frame synchronization between the digital network and the exchange; and
time-division switch means, responsive to the clocking signal output, for producing the frame synchronization signal and performing time-division multiplex transmission while maintaining frame synchronization.

10. An exchange according to claim 9, wherein the frequency F satisfies the following relationship:

$$F=f(1+\epsilon_1+\epsilon_2).$$

11. An exchange for a digital network which transmits data at a predetermined data transmission frequency, comprising:
means for extracting a clock from the digital network, the clock having a period corresponding to a data frame period of the digital network;
oscillator means for generating a reference clock whose frequency is higher than the data transmission frequency;

clock generating means, responsive to said oscillating means, for receiving the reference clock from said oscillator means and for generating a periodic clocking signal output having a frequency F which is determined by the extracted clock and the reference clock, wherein the period of said periodic clocking signal output is shorter than the data frame period of the digital network so as to establish a frame synchronization between the digital network and the exchange, and the frequency F of the periodic clocking signal output satisfies the following relationship:

an active period for the extracted clock <

$$\frac{1}{F(1-\epsilon_2)} < \frac{1}{f(1+\epsilon_1)}$$

where f is the frequency of the exchange reference clock, $\epsilon_1$ is an absolute value of a frequency error of a carrier signal in the digital network expressed in ppm, and $\epsilon_2$ is an absolute value of a frequency error of said clock generating means expressed in ppm; and means for exchanging data from the digital network in synchronization with the periodic clocking signal output generated by said clock generating means.

* * * * *

UNITED STATES PATENT AND TRADEMARK OFFICE
CERTIFICATE OF CORRECTION

PATENT NO. : 5,077,734
DATED : December 31, 1991
INVENTOR(S) : Eiji Ohtsuka

It is certified that error appears in the above-identified patent and that said Letters Patent is hereby corrected as shown below:

Claim 1, column 10, line 68, delete "pl".

Claim 7, column 11, line 57, change "aid" to --said--.

Claim 11, column 14, line 6, change "$\epsilon 1$" to --$\epsilon_1$--.

Claim 11, column 14, line 8, change "$\epsilon 2$" to --$\epsilon_2$--.

Signed and Sealed this

Sixth Day of July, 1993

Attest:

MICHAEL K. KIRK

Attesting Officer

Acting Commissioner of Patents and Trademarks